(12) United States Patent
Preijert

(10) Patent No.: US 7,246,808 B2
(45) Date of Patent: Jul. 24, 2007

(54) WHEEL SUSPENSION FOR VEHICLES

(75) Inventor: Stefan Preijert, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 11/163,591

(22) Filed: Oct. 24, 2005

(65) Prior Publication Data

US 2006/0113744 A1    Jun. 1, 2006

Related U.S. Application Data

(63) Continuation of application No. PCT/SE2004/000370, filed on Mar. 15, 2004, now abandoned.

(30) Foreign Application Priority Data

Apr. 24, 2003   (SE) .................................... 0301191

(51) Int. Cl.
*B60G 7/00* (2006.01)
(52) U.S. Cl. ............................................. 280/124.17
(58) Field of Classification Search ........... 280/124.17, 280/124.174, 124.175
See application file for complete search history.

(56) References Cited

U.S. PATENT DOCUMENTS

| | | | |
|---|---|---|---|
| 2,300,557 A | 11/1942 | Dondlinger | |
| 3,157,238 A | 11/1964 | Kraemer et al. | |
| 3,734,530 A | 5/1973 | Popelar et al. | |
| 4,886,292 A * | 12/1989 | Azamatov et al. | 280/680 |
| 5,209,518 A * | 5/1993 | Heckenliable et al. | 280/680 |
| 5,992,831 A * | 11/1999 | Hellwig | 267/45 |
| 6,206,407 B1 * | 3/2001 | Fuchs et al. | 280/686 |
| 6,273,441 B1 * | 8/2001 | Neavitt et al. | 280/124.174 |
| 6,425,595 B1 * | 7/2002 | Soles et al. | 280/124.175 |

FOREIGN PATENT DOCUMENTS

| | | | |
|---|---|---|---|
| FR | 2197741 A | | 3/1974 |
| GB | 324036 A | | 1/1930 |
| JP | 11048732 A | * | 2/1999 |
| WO | WO 02/42099 A1 | | 5/2002 |

* cited by examiner

*Primary Examiner*—Faye M. Fleming
(74) *Attorney, Agent, or Firm*—Novak Druce & Quigg, LLP

(57) ABSTRACT

A wheel suspension for vehicles that includes leaf spring assemblies mounted in pairs on each side of the vehicle in the longitudinal direction of the vehicle and also at least one damper device mounted on the vehicle in conjunction with at least one wheel axle. The wheel suspension also has a central section of each leaf spring assembly which is mounted rotatably relative to an attachment device fixed to the vehicle, the ends of each leaf spring assembly being attached movably relative to the vehicle, where at least one of the ends of each leaf spring assembly supports a wheel axle and a damper device.

17 Claims, 8 Drawing Sheets

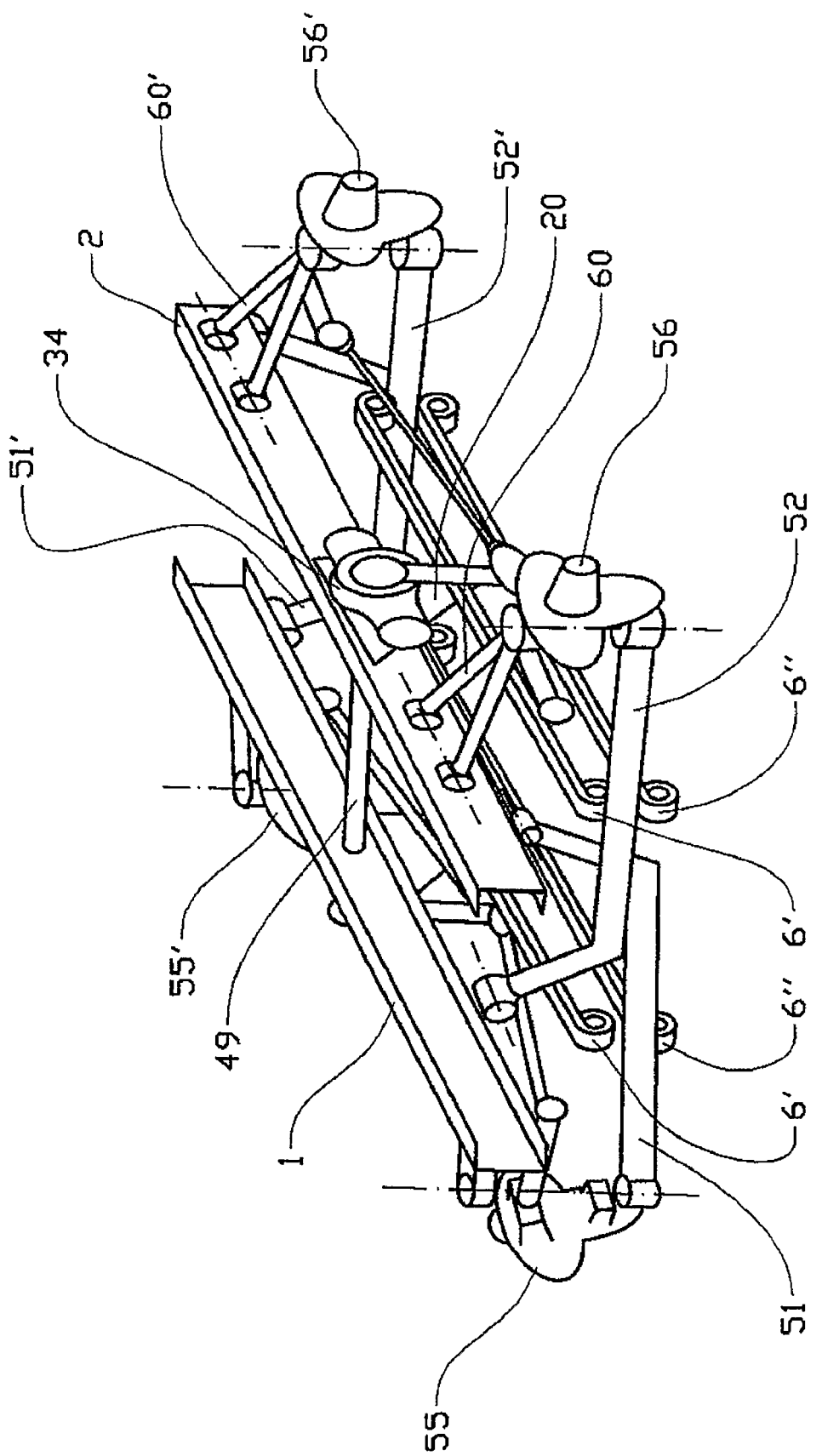

WHEEL SUSPENSION FOR VEHICLES

CROSS-REFERENCE TO RELATED APPLICATIONS

The present application is a continuation patent application of International Application No. PCT/SE2004/000370 filed 15 Mar. 2004 now abandoned which was published in English pursuant to Article 21(2) of the Patent Cooperation Treaty, and which claims priority to Swedish Application No. 0301191-3 filed 24 Apr. 2003. Said applications are expressly incorporated herein by reference in their entireties.

TECHNICAL FIELD

The present invention relates to wheel suspensions for vehicles, and in particular for heavy-duty vehicles in which the wheel suspension includes leaf springs.

BACKGROUND OF THE INVENTION

Wheel suspensions including leaf springs are common for heavy-duty vehicles, especially for vehicles built on a frame made of longitudinal beams. Two or more leaf springs are as a rule mounted in the form of a leaf spring assembly attached at its ends to the underside of the frame. In order to allow a resilient movement of an axle mounted in the center of the assembly, one end of the assembly can be movably mounted relative to the frame, the leaf springs being displaceable in the longitudinal direction.

A conventional wheel suspension of this kind requires two attachment points on the frame. This contributes to problems with the packing of other components and equipment which have to be mounted on and around the frame. The problem is especially great in connection with front-wheel suspensions, where components for suspension and steering have to be adapted to the space for the engine. The problems are correspondingly greater for vehicles with twin front axles where two leaf spring assemblies carry a bogie suspension with two axles. For vehicles with bogie suspension, problems of variation in the toe-in of the front wheels can arise on account of different stiffness in the spring assemblies. As a rule, a conventional wheel suspension with leaf springs also requires support by reaction struts and link arms. Each such component added to the wheel suspension increases the weight of the vehicle.

The conventional solution with an axle mounted in the center of a leaf spring assembly can also give rise to further problems. An example of this is the tendency of the wheel bearing housing to be rotated during braking of the vehicle, something that is known as wind-up stiffness, with an attendant change in camber.

DISCLOSURE OF THE INVENTION

An object of the present invention is to produce a wheel suspension which allows easier and more compact packing, and also which counteracts brake steering and other problems with wheel axle angles.

A preferred embodiment of the invention relates to a wheel suspension for vehicles that includes leaf spring assemblies mounted in pairs on each side of the vehicle in the longitudinal direction of the vehicle and also at least one damper device mounted between the vehicle and at least one wheel axle. A central section of each leaf spring assembly is mounted rotatably relative to an attachment device fixed to the vehicle, the ends of each leaf spring assembly being attached movably relative to the vehicle. At least one of the ends of each leaf spring assembly supports a wheel axle, and a damper device is arranged to take up at least part of the movement of each leaf spring assembly.

The damper device can consist of at least one conventional air bellows mounted in conjunction with the wheel axle at at least one end of the leaf spring assembly, or alternatively a rubber damper or a rubber stop mounted correspondingly on the underside of the frame of the vehicle. However, other types of dampers are also possible, such as, for example, some form of pneumatic or hydraulic telescopic damper.

Each leaf spring assembly comprises (includes, but is not necessarily limited to) at least two single leaf springs, where the respective ends of the leaf springs in each leaf spring assembly form a parallelogram. The leaf springs in each leaf spring assembly are preferably attached at a predetermined distance from one another along the entire length of the leaf spring assembly. This can be brought about by the leaf springs being arranged in an assembly where they are kept separate at their ends and also at the attachment point on the vehicle. The distance is on the whole constant in the unloaded state, when the vehicle is stationary. However, the mounting of the leaf spring assembly is intended to counteract the distance being changed when the springs are loaded.

The attachment device of the wheel suspension can consist of a rocker in which a spring device in the form of a leaf spring assembly comprising at least two single leaf springs is suspended. The leaf spring assembly is suspended in the rocker in, or in close proximity to its central section, and a parallelogram is formed on each side of the attachment points of the leaf springs in the central section. Each leaf spring assembly therefore forms two parallelograms. By virtue of the fact that the leaf springs arranged in pairs form parallelograms, they can function as both spring means and reaction struts for the respective wheel axle. By mounting at least one air bellows at at least one end of the leaf spring assembly, thinner individual leaf springs can be used without the spring constant of the leaf spring assembly being affected appreciably.

With an attachment device that is configured according to the present invention's teachings, only one bearing attachment point is required for the leaf spring assembly. By eliminating one attachment point, space is freed, which can be used in designing the engine, the cab and the mounting for the front fender and associated deformation zone.

According to another embodiment, the wheel suspension comprises a rigid or individual front wheel axle with steerable wheels. Such an axle can be mounted at the front or rear end of the leaf spring assembly. In this connection, the damper device can be mounted in conjunction with the front wheel axle.

According to another embodiment, the wheel suspension comprises two front wheel axles with steerable wheels. These two axles can be mounted at the front and rear ends of the leaf spring assembly. In such a type of bogie suspension, a damper device of the kind indicated above can be mounted in conjunction with each front wheel axle. According to this embodiment of the invention, a wheel axle is mounted at each end of the leaf spring assembly, with at least one air bellows or a rubber stop in conjunction with each end. By virtue of the fact that a single leaf spring assembly is used for suspension of two axles, the total length of the installation for a two-axle arrangement can be halved compared with a standard installation. By using the same leaf spring assembly for a front and a rear axle, and having the leaf spring assembly function as a reaction strut, the number of components in the wheel suspension can be reduced.

The wheel suspension according to the present invention can be provided with one or more rigid axles, axles with individually suspended wheels, or a combination thereof. Separate wheel suspension can be brought about with the aid of bearing arms mounted on the opposite side of the longitudinal axis of the frame relative to their respective steering knuckles. The bearing arms can be fixed either to the respective frame beam or to a sub-frame connecting the frame beams. Each steering knuckle can also be supported by a combination of at least one bearing arm and a transverse link. For wheel suspensions with a rigid front axle, further support for lateral forces can be brought about by a stabilizer or with the aid of stabilizer struts, for example of the Panhard type. According to an alternative embodiment, double transverse links can be used in order to minimize variations in wheel inclination, also referred to as camber.

The present wheel suspension leads to improved comfort, more uniform distribution of load and smaller stresses on the frame. The tendency of the wheel bearing housing to be rotated when the vehicle is braked, also referred to as wind-up motion, and also the change in wheel axis inclination, also referred to as caster angle, during braking can be counteracted with the aid of the invention.

By eliminating tie rods and tie rod arms in the wheel suspension according to the invention, variations in the toe-in of the wheels on account of different rigidity in axles and different axle geometries can practically be eliminated.

The steering system is operated by a steering wheel, the movement of which is transmitted to the steering gear via rotatable shafts. The steering system can also comprise a pair of steering gear arms, which are preferably mechanically connected in order to transmit the movement of the steering gear from one side of the frame to the other. Each steering gear arm is connected to the steering knuckle in a conventional way via a link arm and a steering arm. Each steering knuckle is mounted rotatably at the ends facing away from the frame of an axle or of the respective bearing arm and supports wheel bearing and wheel. A given steering wheel deflection then brings about predetermined steering deflections, corresponding to the steering wheel deflection, for the wheels, where an inner wheel seen relative to the turning radius of the vehicle has a slightly greater wheel angle than an outer wheel according to Ackermann's principle. For an embodiment as above, comprising a bogie suspension with two steerable wheel pairs, the distance between front and rear wheel axle also has to be taken into consideration.

The steering system is simplified by virtue of the fact that the rotatable shafts can be positioned in any positions without other components in the steering system or wheel suspension having to be changed or modified. By positioning a steering gear arm on each side of the frame of the vehicle, tie rods and tie rod arms can be eliminated. Conventional, relatively heavy steering rods can be replaced by thinner and lighter rotatable steering shafts. Lighter shafts and attachments for transmitting the movements of the steering system also allow simpler and more flexible interfaces between cab and chassis.

BRIEF DESCRIPTION OF THE DRAWINGS

The invention will be described in greater detail below with a number of different illustrative embodiments with reference to accompanying diagrammatic drawing figures, in which:

FIG. 8 is a perspective view of a vehicle frame provided with a wheel suspension configured according to the invention.

DETAILED DESCRIPTION

Figure 1:
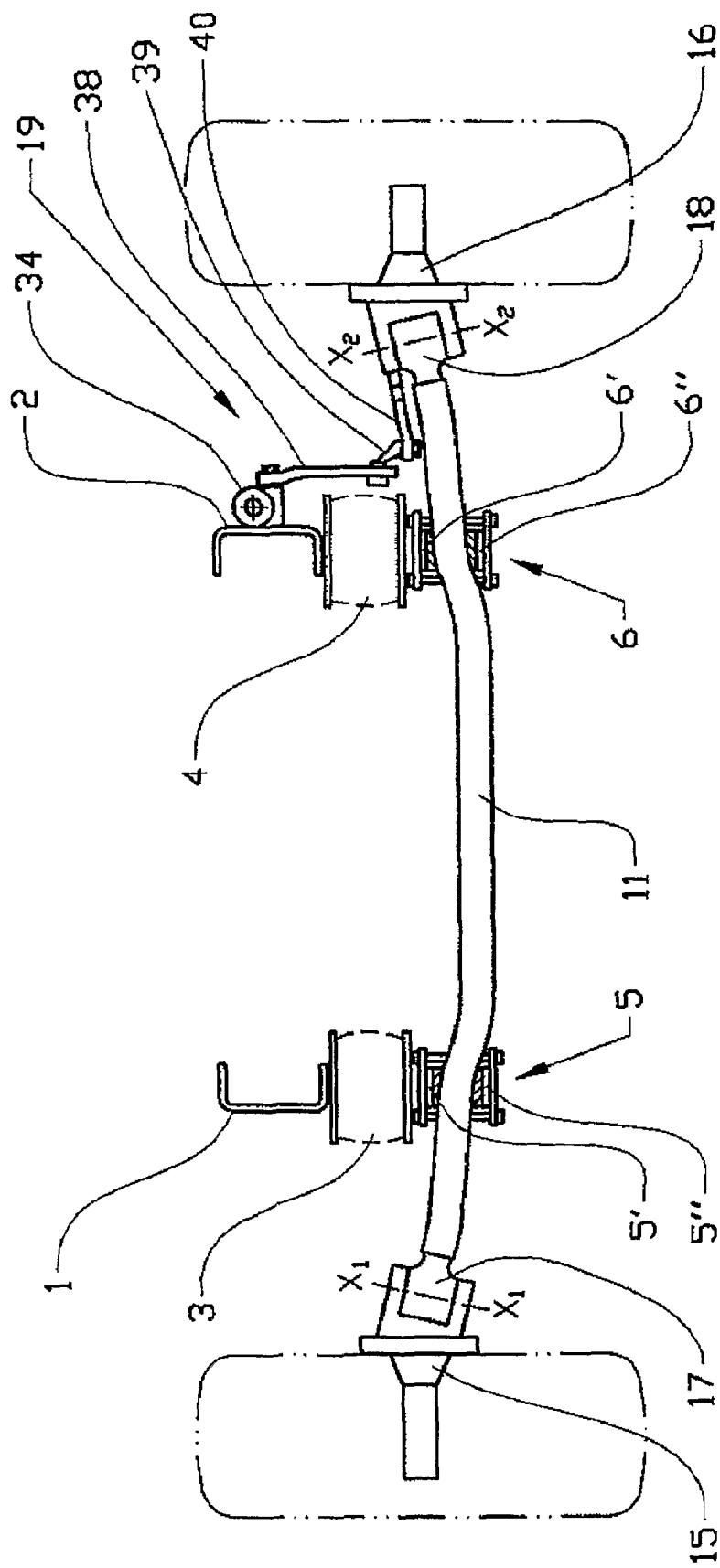
FIG. 1 is a front elevational view of a wheel suspension for a front axle in the form of a hollow tubular axle configured according to one embodiment of the present invention.

FIG. 1 shows a diagrammatic wheel suspension for a vehicle constructed on a frame which includes of two longitudinal beams 1, 2, in this case a pair of U-beams. The lower sections of the beams rest on a pair of damper devices in the form of air bellows 3,4. Each air bellows 3,4 is mounted in conjunction with one end of a leaf spring assembly 5,6, each leaf spring assembly comprising a pair of parallel leaf springs 5', 5"; 6', 6". The leaf spring assemblies 5,6 are mounted in the longitudinal direction of the beams 1,2, with the leaf springs 5', 5" and 6', 6" arranged in pairs positioned at an, on the whole, constant distance from one another. The distance is on the whole constant in the unloaded state, when the vehicle is stationary. However, the mounting of the leaf spring assembly is intended to counteract the distance being changed when the springs are loaded.

The leaf spring assemblies 5,6 support a rigid axle 11 arranged transversely to the longitudinal axis of the beams 1,2. According to the embodiment in FIGS. 1 and 2, the axle 11 is fixed to the front end of each leaf spring assembly, seen in the longitudinal direction of the vehicle. The axle 11 is intended for steerable wheels 13,14 (indicated by broken lines) and is provided with a pair of steering knuckles 15,16 which are pivotable about corresponding axes X1, X2 at the respective outer ends 17,18 of the axle 11. The wheel suspension also comprises a steering linkage 19, which will be described in greater detail with reference to FIG. 2. Steering movements can be transmitted to the wheel on the opposite side of the frame by means of a conventional system of link arms, or by a directly mechanically coupled steering gear arm (see FIG. 4).

Figure 2:
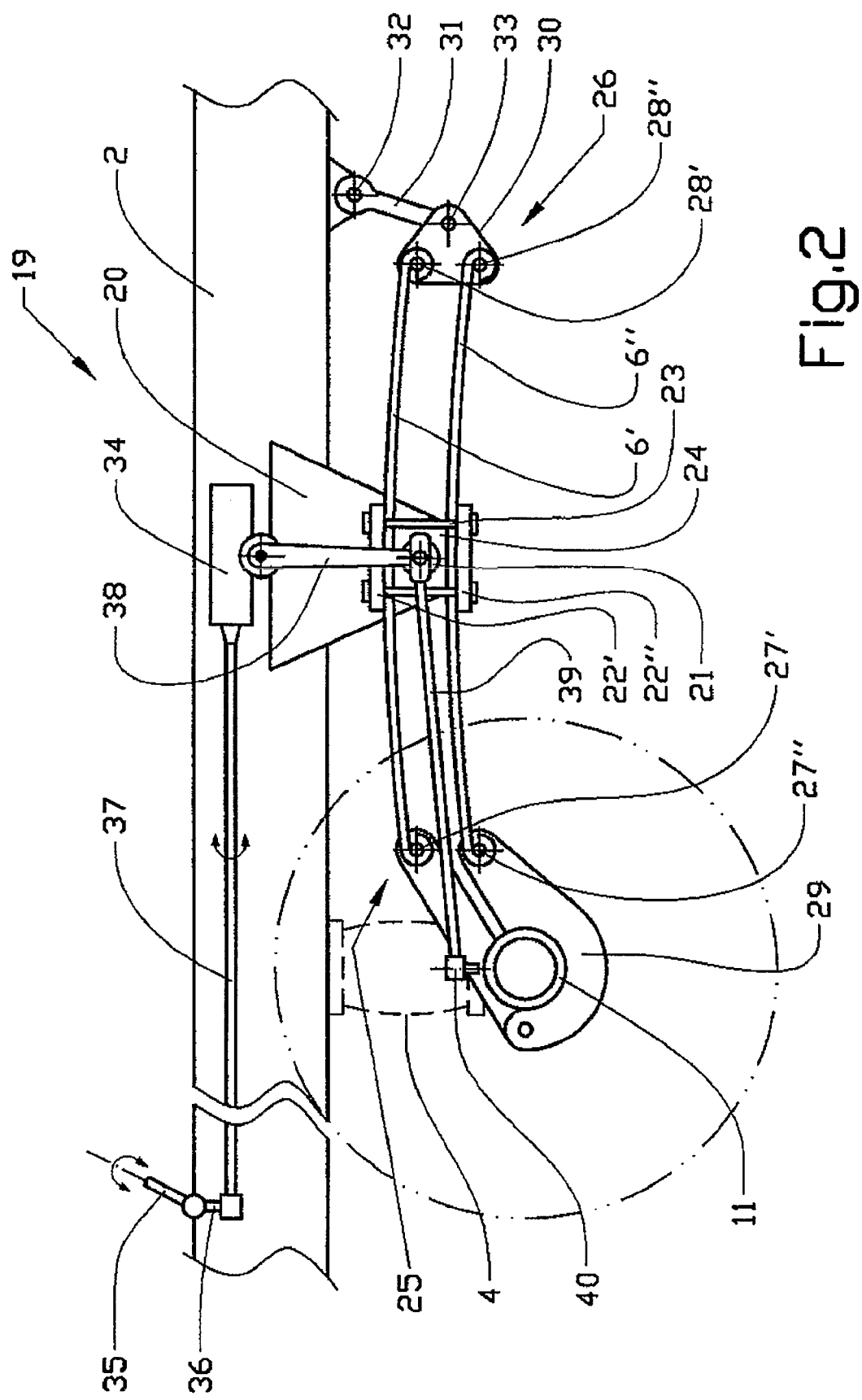
FIG. 2 is a side elevational view of the wheel suspension according to FIG. 1.

FIG. 2 shows a side view of the wheel suspension in FIG. 1, seen from the right side of the vehicle. As can be seen from the figure, the leaf spring assembly is attached to a holder 20, which at its upper end is fixed to the beam 2 and at its lower end is provided with an attachment point for the leaf spring assembly. The lower attachment point consists of a pin 21 mounted between the holder 20 and the leaf spring assembly 6 so as to allow rotation of the leaf spring assembly 6 relative to the holder 20 about the pin 21. The pin 21 is arranged at right angles relative to a vertical plane through the leaf springs. The leaf spring assembly 6 is attached in its central section, the leaf springs being held clamped by means of an upper plate 22' and a lower plate 22" which bear against the upper and lower side respectively of the leaf spring assembly. The plates 22', 22" are held together by a number of tension rods 23 provided with tightenable nuts at their ends. Tightening the nuts results in the plates 22' and 22" being drawn together and locking the leaf springs 6', 6" against a distance element 24 positioned between the leaf springs and provided with a mounting for the pin 21. The distance element has a thickness which corresponds to the desired distance between the leaf springs 6', 6" and can be provided with compressible, vibration-damping layers on the surfaces which are intended to bear against the leaf springs.

The wheel axle 11 is mounted at the front end 25 of the leaf spring assembly. In this connection, both the front and rear ends 25,26 of each leaf spring 6', 6" are in the form of an eye through which a bolt 27', 27"; 28', 28" can be guided. At the front end 25 of the leaf spring assembly, the through-bolts 27', 27" are attached to a holder 29 for the wheel axle 11. After the holder 29 has been mounted and clamped firmly around the wheel axle 11, the bolts 27' and 27" are locked at an essentially fixed distance relative to one another in a substantially vertical plane transverse to the longitudinal axis of the vehicle. The bolts 27', 27" are held in place by a pair of plates (not shown) on each side of the end 25 of the leaf spring assembly, the bolts and the plates preventing the distance between the ends of the two leaf springs 6', 6" being changed when the axle 11 moves resiliency in the vertical direction. Note that in FIG. 2 the steering knuckle 16 has been removed, and the air bellows 4 has been drawn in broken lines in order to expose the mounting of the wheel axle 11.

At the rear end 26 of the leaf spring assembly, the leaf springs 6', 6" are provided with a corresponding arrangement of through-bolts 28', 28" and plates 30. However, the rear end 26 is attached to the beam 2 via a strut 31 which is attached movably to the beam 2 and the plates 30 at a first and second pivot axis 32, 33 respectively. This arrangement is intended to prevent the rear end 26 of the leaf spring assembly moving in the vertical direction, at the same time as a certain, limited movement can be allowed in the horizontal direction if the parallelogram formed by the attachments for the ends of the two leaf springs 6', 6" should be displaced relative to one another during a springing movement.

The vehicle is also provided with a steering system, which is operated by a steering wheel (not shown), the movement of which is transmitted to a steering gear 34 via rotatable shafts 35,36,37. The steering system also comprises a steering gear arm 38, which is preferably mechanically connected to a corresponding arm (not shown) on the opposite side of the vehicle in order to transmit the movement of the steering gear to the other side of the frame. Each steering gear arm 38 is connected to the steering knuckle 16 in a conventional way via a link arm 39 and a steering arm 40. Each steering knuckle 15,16 is mounted rotatably at the ends of the axle 11 facing away from the frame (see FIG. 1).

Figure 3:
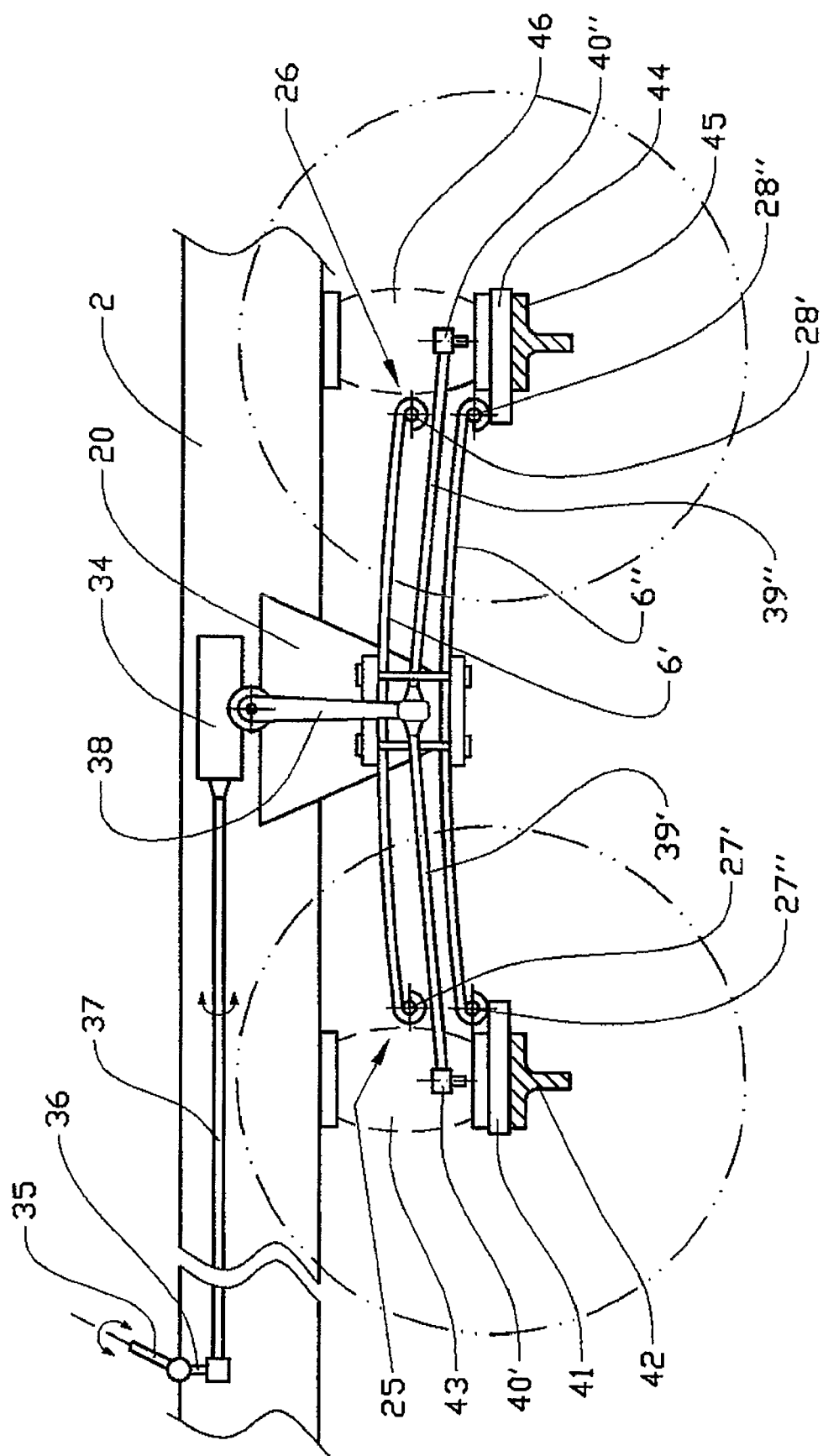
FIG. 3 is a side elevational view of a wheel suspension with twin front axles configured according to an alternative embodiment of the invention.

FIG. 3 shows a side view of a wheel suspension of bogie type, comprising two wheel axles with steerable wheels. In this connection, the attachment of the leaf spring assembly to the holder 20 fixed to the beam 2 has been described in connection with FIG. 2 above. This is also true of the attachment of the ends of the leaf springs 6' and 6" by means of a pair of through-bolts 27', 27" to a pair of plates (not shown) on each side of the front end 25 of the leaf spring assembly. These plates are fixed to or integrated with a mount 41, on the lower side of which the front wheel axle 42 is mounted. Mounted between the upper side of the mount 41 and the beam 2 is a damper device in the form of an air bellows 43. At the rear end 26 of the leaf spring assembly, corresponding through-bolts 28' and 28" and plates are fixed to or integrated with a mount 44, on the lower side of which the front wheel axle 45 is mounted. Mounted between the upper side of the mount 44 and the beam 2 is a damper device in the form of an air bellows 46. According to this embodiment, both the wheel axles 42,45 consist of rigid front axles, which have been designed with a T-shaped cross section in conjunction with the position of the air bellows in order to facilitate mounting of these.

It is of course possible to replace each air bellows with a damper device in the form of a rubber stop, mounted on the underside of the vehicle frame in conjunction with one or both ends of the leaf spring assembly.

The steering system has been described in connection with FIG. 2 and differs from this only in that the steering gear arm 38 controls a front and a rear link arm 39', 39" and associated steering arms 40', 40" so as to be capable of steering the wheels on both the wheel axles. For both the embodiments shown in FIGS. 2 and 3, the leaf spring assembly functions as a reaction strut for the respective wheel axles.

Figure 4:
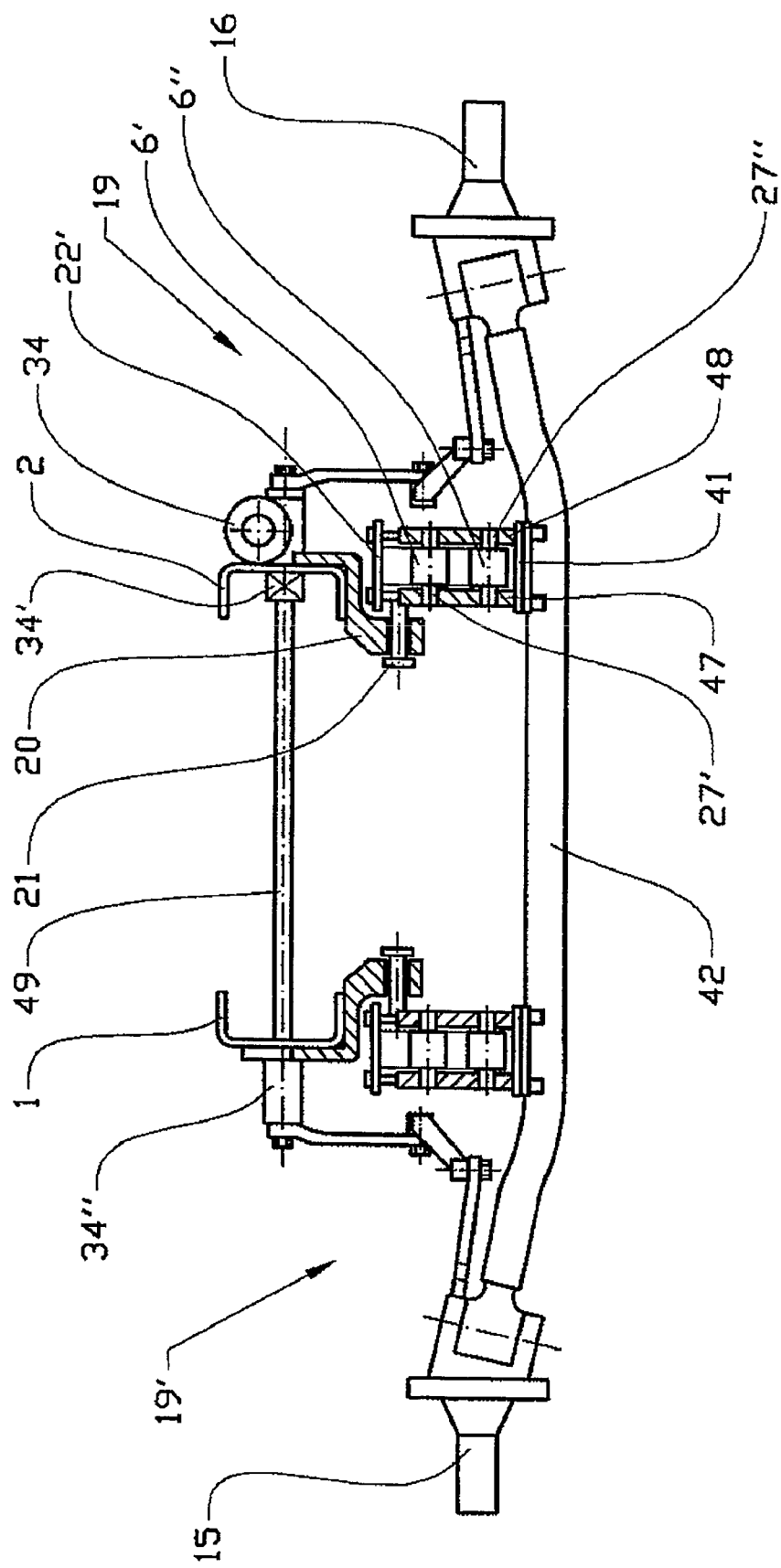
FIG. 4 is a partial cross-sectional front elevational view of the wheel suspension according to FIG. 3.

FIG. 4 shows a front view of the wheel suspension according to FIG. 3, the front wheel axle 42 being shown. The figure is partly sectioned through the front attachment of the leaf spring assembly, for which reason the front air bellows are not shown. As the leaf spring assemblies are identical, even if mirror-inverted, on respective sides of the frame, only one side of the wheel suspension with associated spring assembly will be described.

The figure shows the positioning of the holder 20 relative to the beam 2, and how the pin 21 is attached rotatably to the holder 20. The attachment of the spring assembly to the pin 21, which has been described in connection with FIG. 2, is indicated by the upper plate 22' of the central attachment. Also visible are the front ends of the leaf springs 6', 6", which are attached by through-bolts 27', 27" to plates 47,48 positioned on each side of the leaf spring assembly. As described above, the plates 47,48 are attached to a mount 41 on which the wheel axle 42 is mounted.

The steering linkage 19 is operated with the aid of the steering gear 34 as described above. The steering gear 34 is moreover provided with a second output shaft 49, which is arranged on the opposite side of the steering gear.

This shaft 49 extends through the beam 2 on which the steering gear is mounted, across the frame and through the beam 1 on the opposite side of the vehicle. A corresponding steering linkage 19' is arranged on this side in order to operate a steering knuckle 15. As the steering linkage 19' is arranged on the opposite side of the vehicle, the movement transmitted has to be reversed. This is brought about in a conventional way by positioning, for example, a differential gear, indicated by 34', on the output shaft of the steering gear 34, the shaft 49 then being rotated in the opposite direction relative to the rotation axis of the steering gear arm 38. Alternatively, a differential gear, indicated by 34", can be mounted on the input shaft of the steering linkage 19'. In this way, operation of the steering gear 34 can simultaneously steer one or two wheel pairs for vehicles provided with one or two front wheel axles according to the invention.

Figure 5:
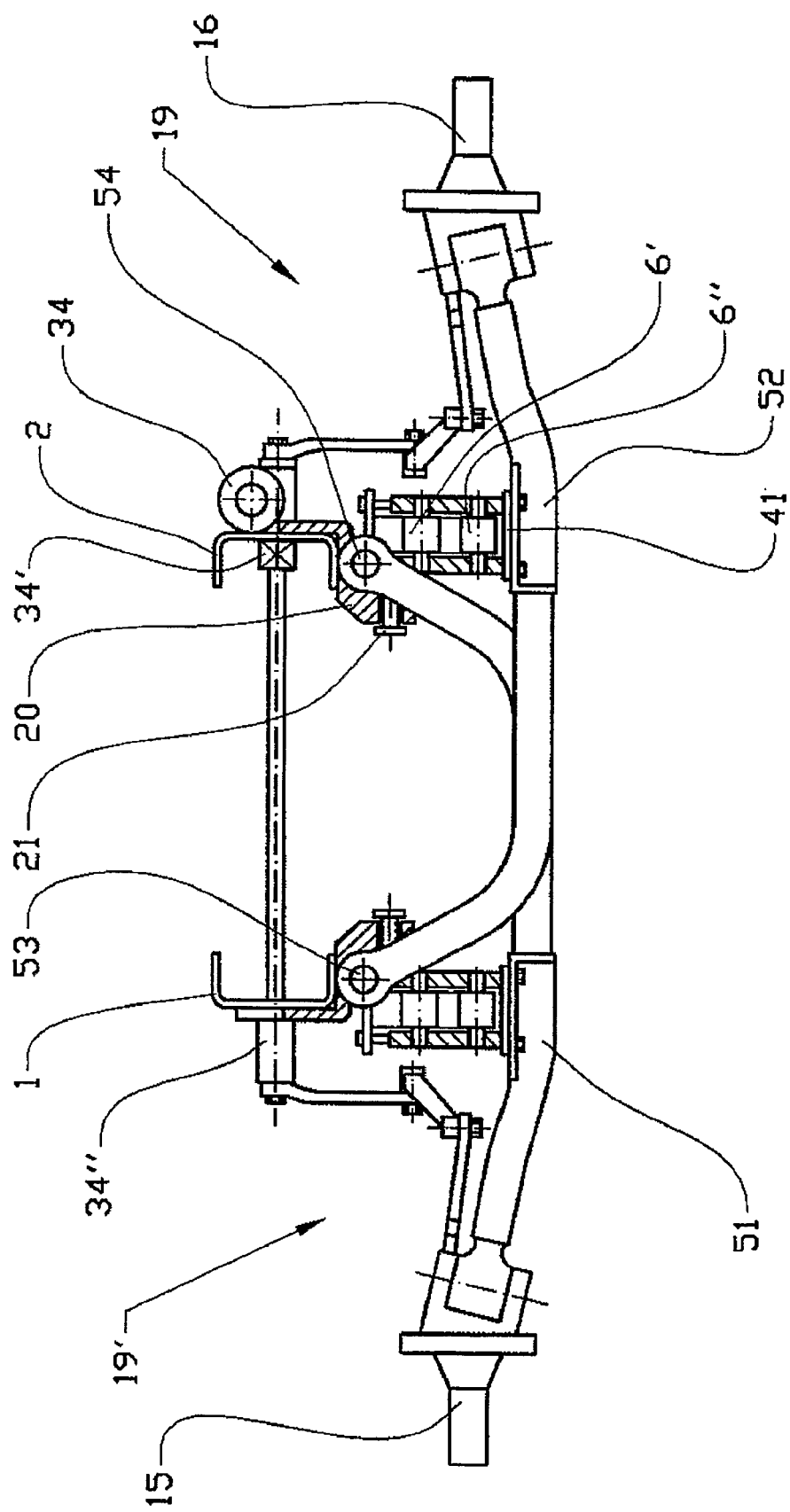
FIG. 5 is a partial cross-sectional front elevational view of individual wheel suspension according to another embodiment of the invention.

FIG. 5 shows a front view corresponding to the wheel suspension according to FIG. 4, where the rigid wheel axle (42, FIG. 4) has been replaced by individual wheel suspension with separate bearing arms. In this connection, the spring assembly is attached by means of the holder 20 and pin 21 in the same way as in FIG. 4. This is also true of the attachment of the front end 25 of the leaf spring assembly and the mounting of the leaf springs 6', 6" on a mount 41 on which a wheel axle, or bearing arm, is mounted.

According to this embodiment, the wheel suspension comprises a pair of individually movable bearing arms 51,52. Each bearing arm is attached rotatably to a pivot arranged in conjunction with the frame, the respective pivot and steering knuckle being arranged on opposite sides of the central longitudinal axis of the vehicle. For example, one end of the bearing arm 52 is connected to the underside of the beam 1 at a pivot 53 which extends parallel to the beam 1. The bearing arm 52 extends from the beam 1, under the frame, transversely to the longitudinal axis of the vehicle. The bearing arm 52 is also attached to the mount 41 in conjunction with the beam 2 and ends in a mount for the steering knuckle 16 at its other end. Correspondingly, the bearing arm 51 is attached rotatably to a pivot 54 under the beam 2, then extending under the frame and the beam 1 to end at the steering knuckle 15.

Figure 6:
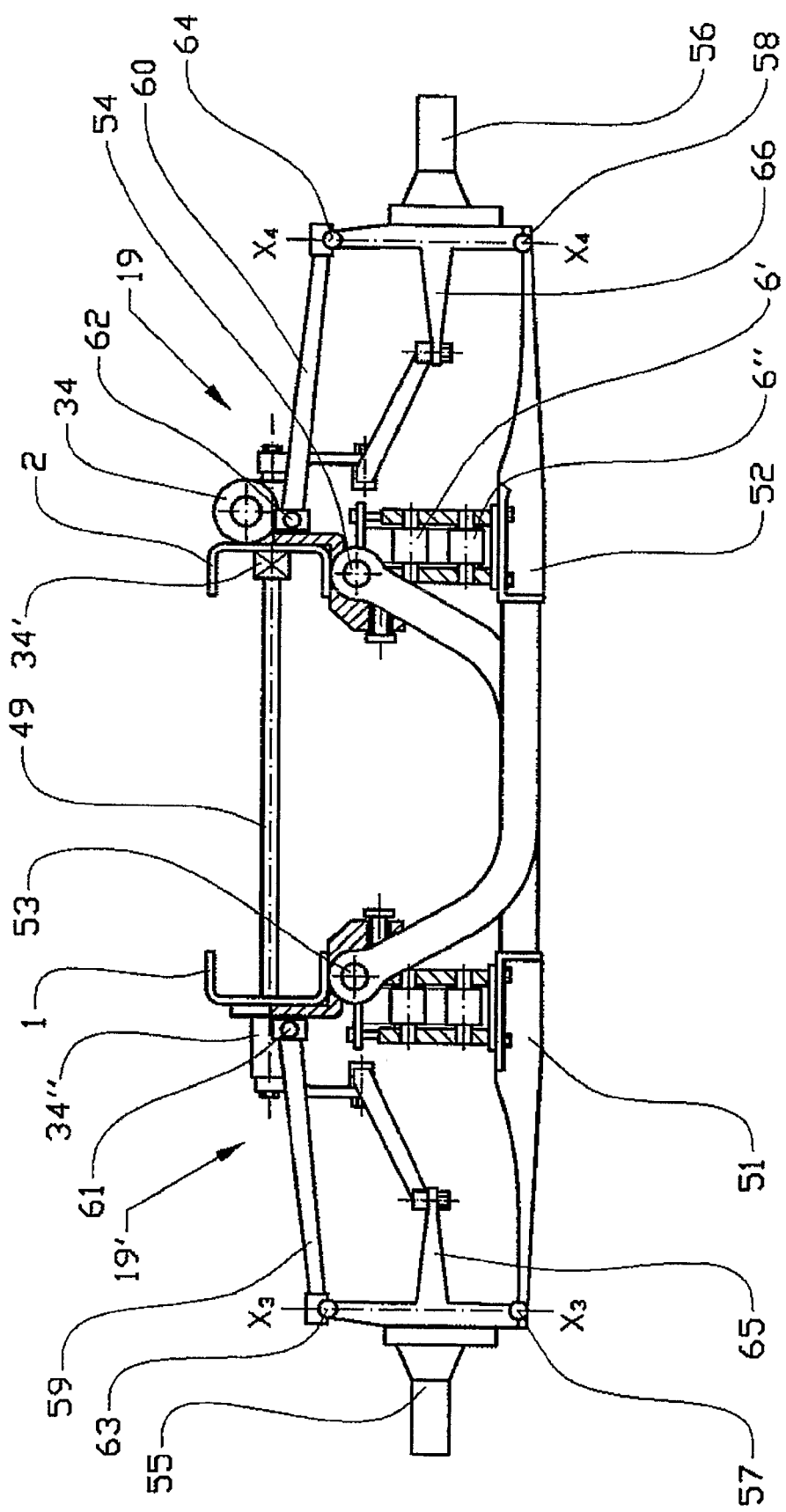
FIG. 6 is a partial cross-sectional front elevational view of individual wheel suspension according to another embodiment of the invention.

FIG. 6 shows individual wheel suspension with separate bearing arms, as described in connection with FIG. 5 above. The attachment of the leaf spring assembly to the beam 2 is therefore carried out in a way corresponding to FIG. 5. This is also true of the attachment of the leaf springs 6', 6" to the bearing arm 52, and in all essentials the steering linkages 19 operated by the steering gear 34.

As indicated above, the bearing arms 51 and 52 are attached rotatably to the pivots 53 and 54 respectively at their first ends. According to this embodiment, the outer ends of the bearing arms 53,54 are attached to a lower end of respective steering knuckles 55,56 by means of a universal joint 57, 58. The respective upper ends of the steering knuckles 55,56 are stabilized by a transverse link 59,60, the inner end of which is attached rotatably to the respective beam 1,2 at a pivot 61,62. The transverse links also are connected to the respective steering knuckle by a universal joint 63, 64. The lower and upper universal joints 57,58 and 63,64 must allow both vertical movement of the steering knuckles when springing movements take place and rotation of the steering knuckles about an axis X3, X4 which extends through the respective upper and lower universal joints 63,57 and 64,58 and allows pivoting of the wheels. The two steering knuckles 55,56 are also provided with an integrated steering arm 65,66 which replaces the separate steering arm 40 described in connection with FIG. 1.

The transverse links indicated above are preferably of what is known as the wishbone type, with two attachment points in conjunction with each beam.

Figure 7:
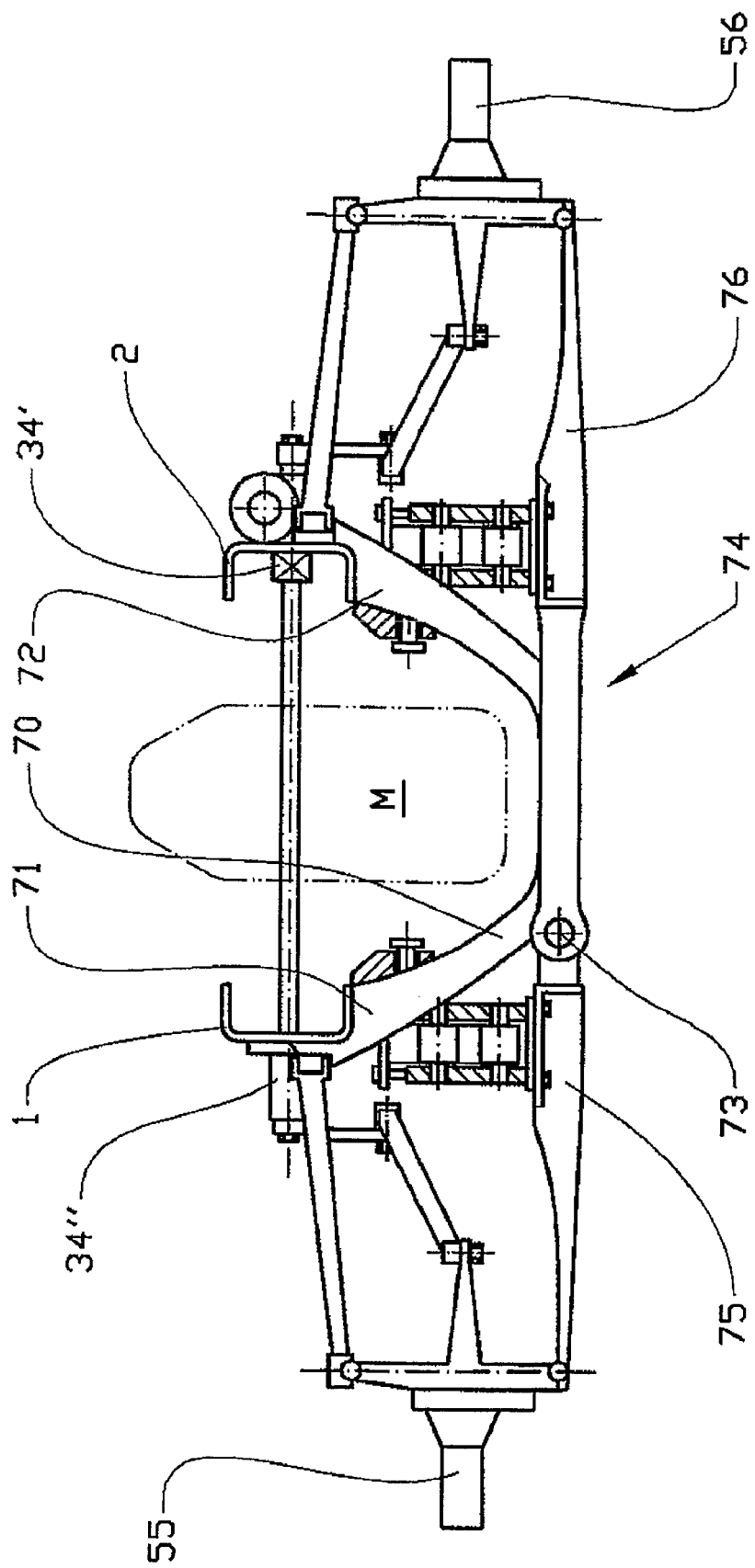
FIG. 7 is a partial cross-sectional front elevational view of individual wheel suspension with a sub-frame according to another embodiment of the invention.

FIG. 7 shows an alternative embodiment of that shown in FIG. 6. According to this embodiment, a sub-frame 70 is mounted between and below the two beams 1,2. The upper ends 71,72 of the sub-frame are mounted on the underside of the respective beam 1,2. From the beams 1,2, the sub-frame 70 extends downward and below an engine M (indicated by broken lines) mounted between and below the beams. The purpose of a sub-frame of this type is to make more space for the engine M by allowing a pivot 73,74 (concealed) of a respective bearing arm 75,76 to be positioned in the lower part of the sub-frame. The bearing arms can thus perform a desired resilient movement without encroaching on the space of the engine. The engine can thus be positioned lower, with corresponding lowering of its center of gravity.

FIG. 8 shows a perspective view of the wheel suspension according to FIG. 6. This figure shows a clear representation of a two-axle wheel suspension with individual front and rear bearing arms 51,52; 51',52', transverse links 60,60' and steering knuckles 55,56; 55',56'. The figure also illustrates how the front and rear transverse links 60; 60' are mounted relative to the respective beam 1,2. The general positioning of the leaf spring assemblies with their two leaf springs 6', 6" in conjunction with the respective beam, on each side of the longitudinal axis of the frame, can also be seen.

The invention is not limited to the illustrative embodiments above and in the drawings but can be varied within the scope of the patent claims below.

What is claimed is:

1. A wheel suspension for vehicles, which wheel suspension comprises leaf spring assemblies mounted in pairs on each side of the vehicle in the longitudinal direction of the vehicle and also at least one damper device mounted on the vehicle in conjunction with at least one wheel axle, a central section of each leaf spring assembly is mounted rotatably relative to an attachment device fixed to the vehicle, the ends of each leaf spring assembly are attached movably relative to the vehicle, and at least one of the ends of each leaf spring assembly supports a wheel axle and each leaf spring assembly comprises at least two single leaf springs wherein each leaf spring assembly forms a parallelogram between the a attachment device and the ends of the leaf springs.

2. The wheel suspension as recited in claim 1, wherein the leaf springs in each leaf spring assembly are attached at a predetermined distance from one another along the entire length of the leaf spring assembly.

3. The wheel suspension as recited in claim 2, wherein each leaf spring assembly constitutes a reaction strut for the respective wheel axle.

4. The wheel suspension as recited in claim 1, wherein the damper device consists of at least one air bellows at at least one end of the leaf spring assembly.

5. The wheel suspension as recited in claim 1, wherein the damper device consists of at least one rubber stop mounted on the vehicle in conjunction with at least one end of the leaf spring assembly.

6. The wheel suspension as recited in claim 1, wherein the wheel suspension comprises a front wheel axle with steerable wheels.

7. The wheel suspension as recited in claim 6, wherein the damper device is mounted in conjunction with the front wheel axle.

8. A wheel suspension for vehicles, which wheel suspension comprises leaf spring assemblies mounted in pairs on each side of the vehicle in the longitudinal direction of the vehicle and also at least one damper device mounted on the vehicle in conjunction with at least one wheel axle, a central section of each leaf spring assembly is mounted rotatably relative to an attachment device fixed to the vehicle, the ends of each leaf spring assembly are attached movably relative to the vehicle, and at least one of the ends of each leaf spring assembly supports a wheel axle, wherein the wheel suspension comprises two front wheel axles with steerable wheels.

9. The wheel suspension as recited in claim 8, wherein a damper device is mounted in conjunction with each front wheel axle.

10. The wheel suspension as recited in claim 9, wherein the damper devices consist of at least one air bellows at both ends of the leaf spring assembly.

11. The wheel suspension as recited in claim 9, wherein the damper devices consist of at least one rubber stop mounted on the vehicle in conjunction with the ends of the leaf spring assembly.

12. A wheel suspension of a vehicle comprising:
leaf spring assemblies mounted in pairs on each side of the vehicle in the longitudinal direction of the vehicle and also at least one damper device mounted on the vehicle in conjunction with at least one wheel axle;
each leaf spring assembly having a central section respectively rotatably mounted relative to an attachment device fixed to the vehicle; and
ends of each leaf spring assembly are attached to and movable relative to the vehicle, and at least one of the ends of each leaf spring assembly supports a wheel axle and wherein each leaf spring assembly comprises least two single leaf springs and wherein each leaf spring assembly forms a parallelogram between the attachment device and the ends of the leaf springs.

13. The wheel suspension as recited in claim 12, wherein the leaf springs in each leaf spring assembly are attached at a predetermined distance from one another along the entire length of the leaf spring assembly and each leaf spring assembly constitutes a reaction strut for the respective wheel axle.

14. The wheel suspension as recited in claim 12, wherein the damper device consists of at least one air bellows at at least one end of the leaf spring assembly.

15. The wheel suspension as recited in claim 12, wherein the damper device consists of at least one rubber stop mounted on the vehicle in conjunction with at least one end of the leaf spring assembly.

16. The wheel suspension as recited in claim 12, wherein the wheel suspension comprises front wheel axle with steerable wheels and the damper device is mounted in conjunction with front wheel axle.

17. The wheel suspension as recited in claim 12, further comprising:
two front wheel axles with steerable wheels;
a damper device is mounted in conjunction with each front wheel axle and the damper devices consist of at least one air bellows at both ends of the leaf spring assembly; and
the damper devices consist of at least one rubber stop mounted on the vehicle in conjunction with the ends of the leaf spring assembly.

* * * * *